(12) United States Patent
Stone et al.

(10) Patent No.: US 8,496,208 B1
(45) Date of Patent: Jul. 30, 2013

(54) ORBIT DEBRIS REMOVAL AND ASSET PROTECTION ASSEMBLY

(71) Applicant: Alliant Techsystems Inc., Minneapolis, MN (US)

(72) Inventors: Steven F. Stone, Irvine, CA (US); Jose L. Guerrero, Temple City, CA (US); Doyle L. Towles, Pasadena, CA (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

(21) Appl. No.: 13/775,976

(22) Filed: Feb. 25, 2013

Related U.S. Application Data

(63) Continuation of application No. 12/909,935, filed on Oct. 22, 2010, now Pat. No. 8,403,269.

(51) Int. Cl.
*B64G 1/40* (2006.01)

(52) U.S. Cl.
USPC ..................... 244/171.1; 244/171.7

(58) Field of Classification Search
USPC ............... 244/171.7, 17.1, 158.9, 164, 173.3, 244/173.1, 158.1, 172.8
See application file for complete search history.

(56) References Cited

U.S. PATENT DOCUMENTS

| | | | | |
|---|---|---|---|---|
| 5,071,091 A * | 12/1991 | Kahn et al. | | 244/121 |
| 5,242,134 A * | 9/1993 | Petro | | 244/158.1 |
| 5,863,844 A * | 1/1999 | Girardot et al. | | 442/1 |
| 6,855,650 B1 * | 2/2005 | Bohannon, Jr. | | 442/32 |
| 7,591,108 B2 * | 9/2009 | Tuczek | | 52/80.1 |
| 2005/0020157 A1 * | 1/2005 | Weiser et al. | | 442/49 |
| 2005/0096615 A1 * | 5/2005 | Kuen et al. | | 604/385.01 |
| 2007/0069082 A1 * | 3/2007 | Bigelow | | 244/171.7 |
| 2007/0200789 A1 * | 8/2007 | Bassily | | 343/915 |
| 2007/0251161 A1 * | 11/2007 | Tuczek | | 52/80.1 |
| 2008/0226870 A1 * | 9/2008 | Sypeck et al. | | 428/137 |
| 2010/0018026 A1 * | 1/2010 | Bassily | | 29/469 |
| 2010/0187364 A1 * | 7/2010 | Kutter et al. | | 244/171.7 |
| 2010/0187365 A1 * | 7/2010 | Kutter et al. | | 244/171.7 |
| 2012/0068018 A1 * | 3/2012 | Wright | | 244/171.7 |
| 2012/0156049 A1 * | 6/2012 | Hong | | 416/224 |

* cited by examiner

*Primary Examiner* — Christopher P Ellis
*Assistant Examiner* — Medhat Badawi
(74) *Attorney, Agent, or Firm* — IPLM Group, P.A.

(57) ABSTRACT

An orbital debris removal assembly is provided. The orbital debris removal and asset protection assembly includes a plurality of spaced layers of netting. Each netting layer includes a plurality of sub-layers of meshed composite fibers that are configured and arranged to break up debris that comes in contact with the assembly.

20 Claims, 11 Drawing Sheets

ORBIT DEBRIS REMOVAL AND ASSET PROTECTION ASSEMBLY

CROSS REFERENCE TO RELATED APPLICATION

This application claims priority to and is a continuation application of U.S. patent application Ser. No. 12/909,935, filed Oct. 22, 2010, now U.S. Pat. No. 8,403,269, entitled ORBIT DEBRIS REMOVAL AND ASSET PROTECTION ASSEMBLY, which is hereby incorporated by reference.

BACKGROUND

Objects that are in orbit around the earth as the result of space initiatives that no longer serve any function are called orbital debris. Examples of orbital debris include spacecraft, upper stages of launch vehicles, debris released during spacecraft separation from its launch vehicle or during mission operations, debris created as a result of spacecraft or upper stage explosions or collisions, solid rocket motor effluents, paint flecks and thermal blankets. Most of the orbital debris is concentrated in what is considered low earth orbits. This orbital debris poses an increasing risk to functioning spacecraft.

It is currently estimated that the orbital debris includes approximately 19,000 objects that are greater than 10 cm in diameter, approximately 500,000 objects that are greater than 1 cm and tens of millions of objects that are smaller than 1 cm. The impact speed of orbital debris on a spacecraft is typically around 10 Km/sec. At this impact speed, objects greater than 1 cm can cause a catastrophic failure to a spacecraft while objects that are less than 1 cm can still cause significant damage. Objects that are greater than 10 cm are tracked by U.S. Space Surveillance Network. Based on the tracking, spacecraft are maneuvered around these relatively large objects. In most situations a protective covering (shield) on the spacecraft can deal with objects less than 3 mm. However, for objects having a diameter greater than 3 mm and less than 10 cm and effective protection mechanism is not currently available.

For the reasons stated above and for other reasons stated below which will become apparent to those skilled in the art upon reading and understanding the present specification, there is a need in the art for an apparatus and method of dealing with orbital debris between 3 mm to 10 cm diameter.

SUMMARY OF INVENTION

The above-mentioned problems of current systems are addressed by embodiments of the present invention and will be understood by reading and studying the following specification. The following summary is made by way of examples and not by way of limitations. The summary is merely provided to aid the reader in understanding some of the aspects of the invention.

In one embodiment, an orbital debris removal and asset protection assembly is provided. The assembly includes a plurality of spaced layers of netting. Each netting layer includes sub-layers of meshed composite fibers configured and arranged to break up debris that comes in contact with the assembly. The composite fibers that make up the meshed fibers have a select thickness. The thickness of the composited fibers of one layer of the plurality of spaced layers of netting is different than the thickness of the fibers in at least one other layer of the plurality of spaced layers of netting.

In another embodiment example, another orbital debris removal assembly is provided. The assembly includes a spacecraft configured to navigate in space and a plurality of spaced netting layers. The plurality of spaced netting layers are coupled to the spacecraft. Each netting layer includes meshed fibers. Each spaced netting layer has a fiber mesh density. The fiber mesh density of one layer of the plurality of spaced netting layers has a different fiber mesh density of at least one other layer of the plurality of spaced netting layers.

In still another example embodiment, another orbital debris removal assembly is provided. The orbital debris removal and asset protection assembly includes a plurality of spaced layers of netting formed in at least a partial sphere shape. Each netting layer includes meshed composite fibers. The plurality of spaced layers of netting have an outer layer, an inner layer and at least one mid layer between the outer layer and the inner layer. Each layer of netting has a select fiber density of the meshed composite fibers. The fiber density of the outer layer is less than the fiber density of the inner layer. The meshed composite fibers of each netting layer have a select fiber thickness. The fiber thickness of the outer layer is larger than the fiber thickness of the inner layer.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

Figure 1:
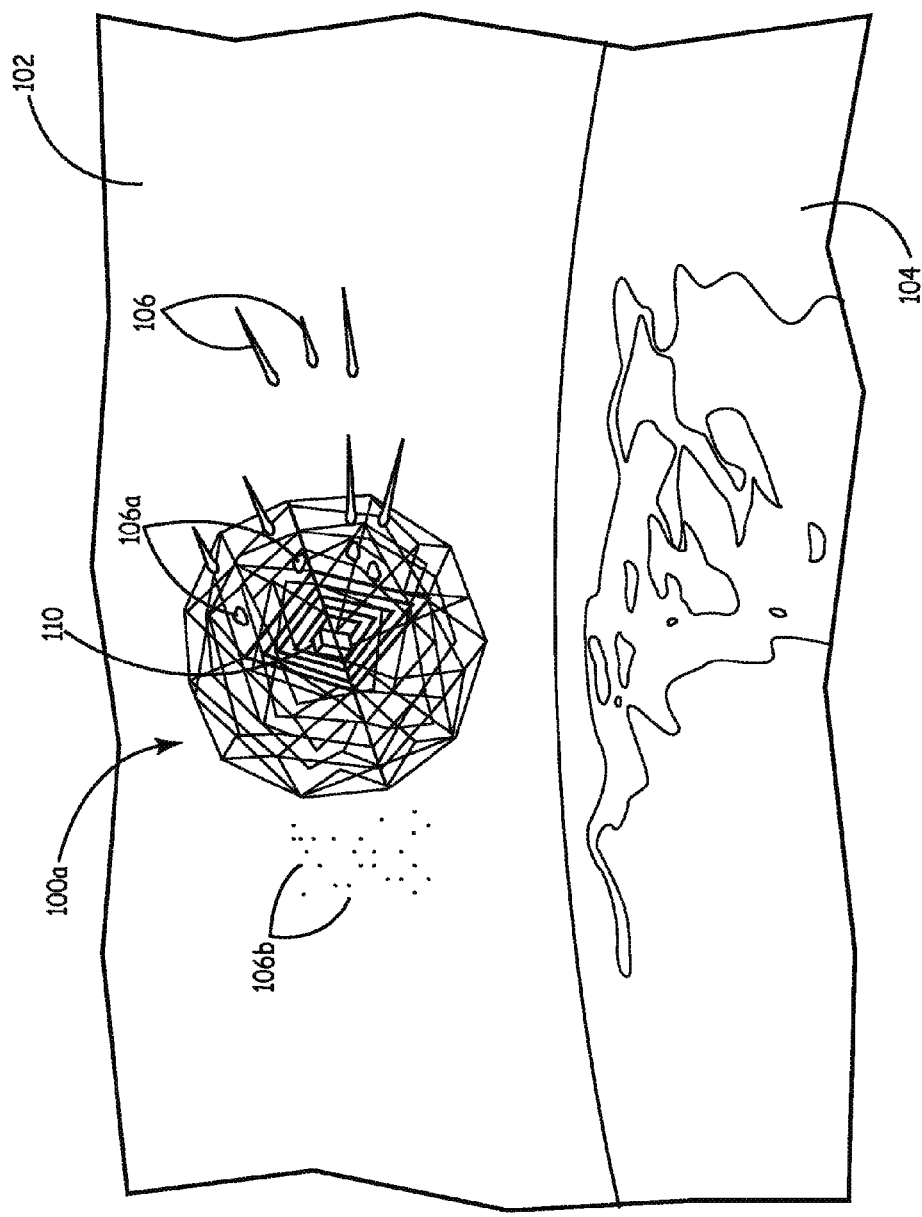
FIG. 1 is an illustration of an orbital debris removal assembly of one embodiment of the present invention.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide an orbital debris removal and asset protection assembly (an orbital debris removal assembly) that effectively deals with space debris. Moreover, embodiments provide a passive impact destruction assembly as opposed to some sort of space weapon thus making its use more acceptable by the international space community. Embodiments use the energy produced by high velocity debris particles against themselves to breakup and create shield-able size particles. In embodiments, a multi-layer critical spaced netting assembly is provided. In one embodiment, the assembly is deployable in an aerospace structure frame that is generally in the shape of a sphere or partial sphere as discussed below. In other embodiments other shapes of the assembly of multi-layer critical spaced netting are used. Moreover, in one embodiment a shape that lends itself to an effective employment is used. The orbital debris removal assembly acts to intercept and pulverize space debris. In one embodiment, the orbital debris removal assembly is designed to be deployed around a critical asset to intercept and pulverize debris. In another embodiment the orbital debris removal assembly is set to roam in space sweeping out and destroying orbital debris.

Each layer of meshed netting of the orbital debris removal assembly includes a mesh density. The mesh density in each layer, in an embodiment, is increased to insure that all the particles sizes of interest will intersect with one of the net layers and the resulting small particles will intersect with further inner netting layers. In embodiments, the wire fiber or fiber thickness of the netting in each layer is sized to ensure the breakup of the incident particle into smaller particles. The multiple mesh layers take advantage of the fact that multiple wired layers are much more efficient on the total areal density basis than an equivalent areal density of a single layer. In addition, the design of the orbital debris removal assembly has an additional feature that allows the probability that a critical fission like effect can be generated wherein multiple debris particles (and within each impact debris particle itself) are generated upon impact with outer mesh layers interacting with incoming debris particles in interior mesh layers causing a cascading impact set of events where the particles will continuously be broken into smaller particles while inside or in the neighborhood of the orbital debris removal assembly. In some embodiments, composite such as, but not limited to, Dyneema fiber bundles are used to form the meshed netting. In other embodiments metal or ceramic fibers are used. The use of composite fibers allows for a savings in mass of 60% over a metal wire configuration.

Figure 2A:
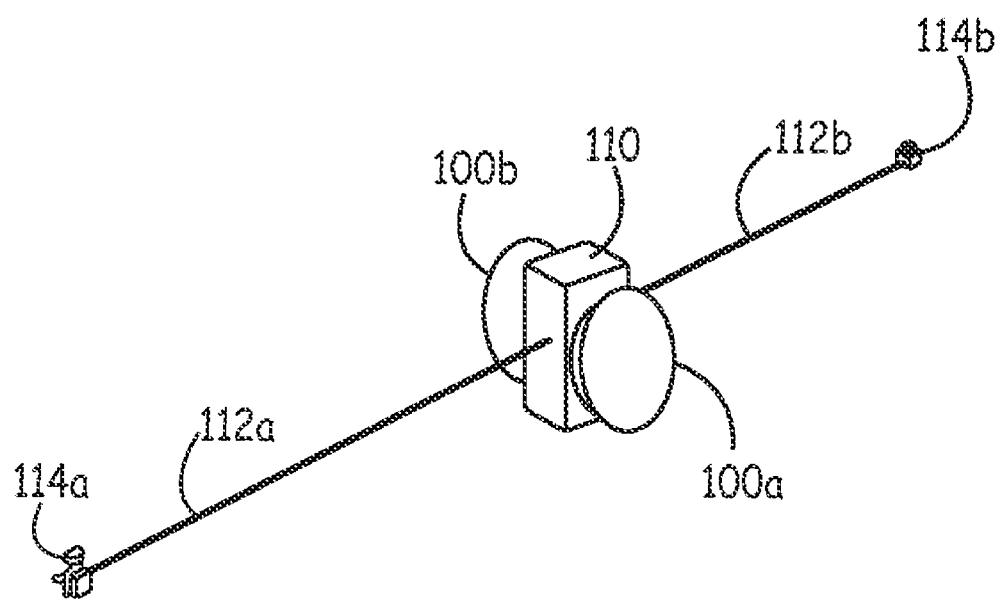
FIG. 2A is an illustration of the orbital debris removal assembly of FIG. 1 in a non-deployed configuration.

Referring to FIG. 1, in an embodiment of an orbital debris removal assembly 100 is illustrated. In particular, the orbital debris removal assembly 100 is illustrated in space 102 orbiting the earth 104. Debris 106 is also illustrated in space 102. Further illustrated is the debris 106a engaging (impacting) the orbital debris removal assembly 100 and residue (or shield-able) debris 106b that has been intercepted and pulverized by the orbital debris removal assembly 100. FIG. 2A illustrates the orbital debris removal assembly 100 of an embodiment. In particular, FIG. 2A illustrates a spacecraft 110 having deployed booms 112a and 112b and thrusters 114a and 114b. The thrusters 114a and 114b are used to position the spacecraft 110 in a desired location in space. The orbital debris removal assembly 100 in this embodiment includes a first section of the orbital debris removal assembly 100a and a second section of the orbital debris removal assembly 100b that are in a non-deployed (stowed) configuration.

Figure 2B:
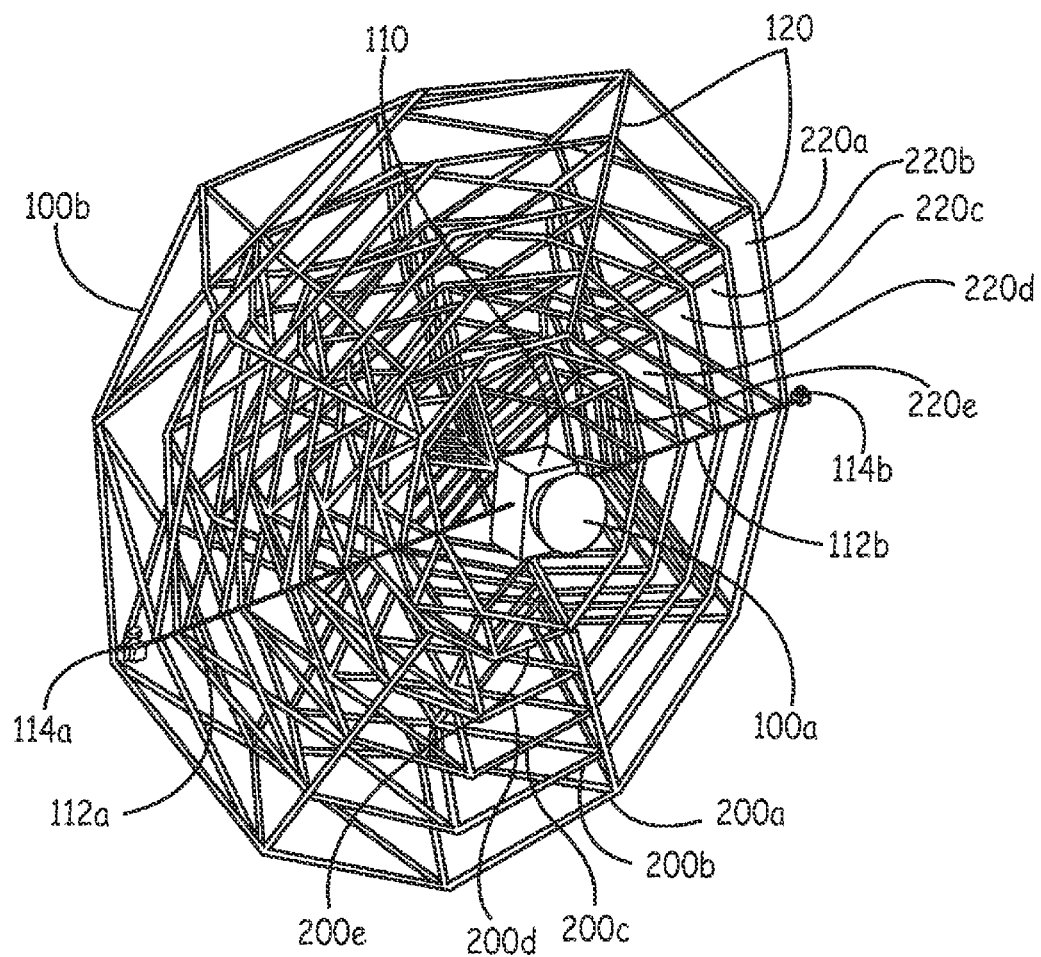
FIG. 2B is an illustration of the orbital debris removal assembly of FIG. 1 in a partial deployed configuration.

As stated above, the first section 100a and second section 100b are in a non-deployed configuration in FIG. 2A. Referring to FIG. 2B, the second section of the orbital debris removal assembly 100b is illustrated in a deployed configuration. This illustration further provides an understanding of the formation of the orbital debris removal assembly 100 in one embodiment. As illustrated, this second section of the orbital debris removal assembly 100b includes a plurality of frame members 120 that form layers of netting 220a, 220b, 220c, 220d, and 220e. Although the illustration shows five layers of netting 220a, 220b, 220c, 220d and 220e, it will be understood that other numbers of layers can be used depending on the application (i.e. size of objects to breakup, density of mesh netting, diameter size of fibers used, etc.) The frame members 120 are further illustrated as forming a first netting support frame 200a for the first layer of netting 220a, a second netting support frame 200b for the second layer of netting 220b, a third netting support layer 200c for the third layer of netting 220c, a fourth netting support frame 200d for the fourth layer of netting 220d, and a fifth netting support frame 200e for the fifth layer of netting 220e. As illustrated, the netting layers 220a-220e include an outer layer 220a and an inner layer 220e and in this embodiment, a plurality of mid-layers 220b-200d.

Figure 2C:
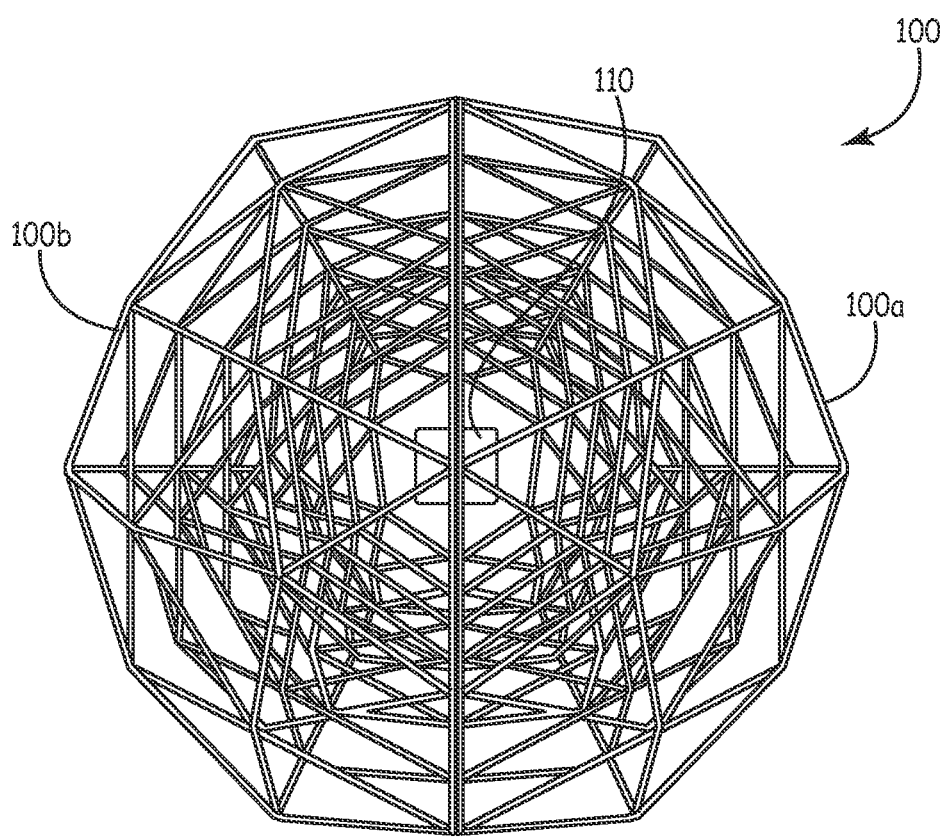
FIG. 2C is an illustration of the orbital debris removal assembly of FIG. 1 in a fully deployed configuration.

Referring to FIG. 2C, an illustration of the orbital debris removal assembly 100 having both the first section 100a and second section 100b deployed is provided. In this embodiment, the spacecraft 110 is totally encased by the spherically shaped netting layers 220a through 220e. Hence in this embodiment, the spacecraft 110 is protected from all directions with the spherically shaped netting. One benefit of having the netting layers 220a-220e in at least a partial spherical shape is that there is no special pointing (positioning) requirements of the spacecraft 110 needed during the interception of the debris 106. The overall diameter of the orbital debris removal assembly 100 is selected based on a desired area to be covered and application. Hence any diameter is contemplated. An example diameter of the orbital debris removal assembly 100 is approximately between 10 to 30 meters.

Figure 3:
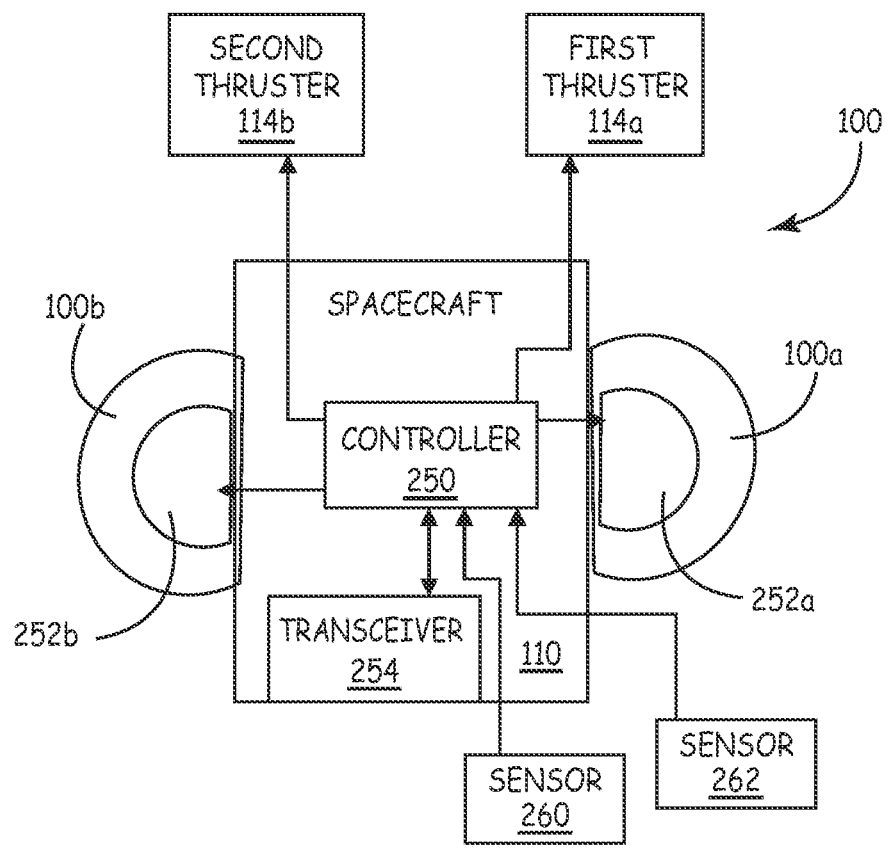
FIG. 3 is a block diagram of the orbital debris removal assembly of FIG. 1 in a non-deployed configuration.

FIG. 3 illustrates a block diagram of an embodiment of the orbital debris removal assembly 100. As illustrated, the spacecraft 110 in this embodiment includes a controller 250 and a transceiver 254. The transceiver is in communication with the controller 250. The transceiver 254 receives instructions from a transmitter on earth (not shown). Based on the instructions received, the controller 250 positions the spacecraft 110 with the first and second thrusters 114a and 114b. The controller 250 is further coupled to control deploying assemblies 252a and 252b. The deploying assemblies 252a and 252b are designed to deploy the respective first and second sections 100a and 100b of the orbital debris removal assembly 100. In one embodiment, the deploying assemblies 252a and 252b are inflatable members. In another embodiment, the deploying assemblies 252a and 252 are activation arms that are designed to selectively deploy and retract the sections 100a and 100b of the orbital debris removal assembly 100. In embodiments, the netting layers 220a-220e can remain in a stored configuration in orbit for future use to prevent catastrophic collisions with an asset or spacecraft 110.

The orbital debris removal assembly 100 of FIG. 3 includes sensors 260 and 262. In one embodiment sensor 260 is an impact sensor that is in communication with the controller 250. The impact sensor 260 senses impact of debris on the orbital debris removal assembly 100. The controller 250 tracks the number of the impacts the orbital debris removal assembly 100 has taken and relays the information to a control station on earth via transceiver 254 in one embodiment. This information can then be used to determine when the orbital debris removal assembly 100 should be replaced. Hence, a maximum number of impacts can be set to indicate replacement of the orbital debris removal assembly 100. In one embodiment, sensor 262 is a velocity sensor 262 that is also in communication with the controller 250. The velocity sensor 262 senses earth directed velocity components of fractured debris. This information would be used to support additional operational guidelines of the orbital debris removal assembly 100.

Figure 4:
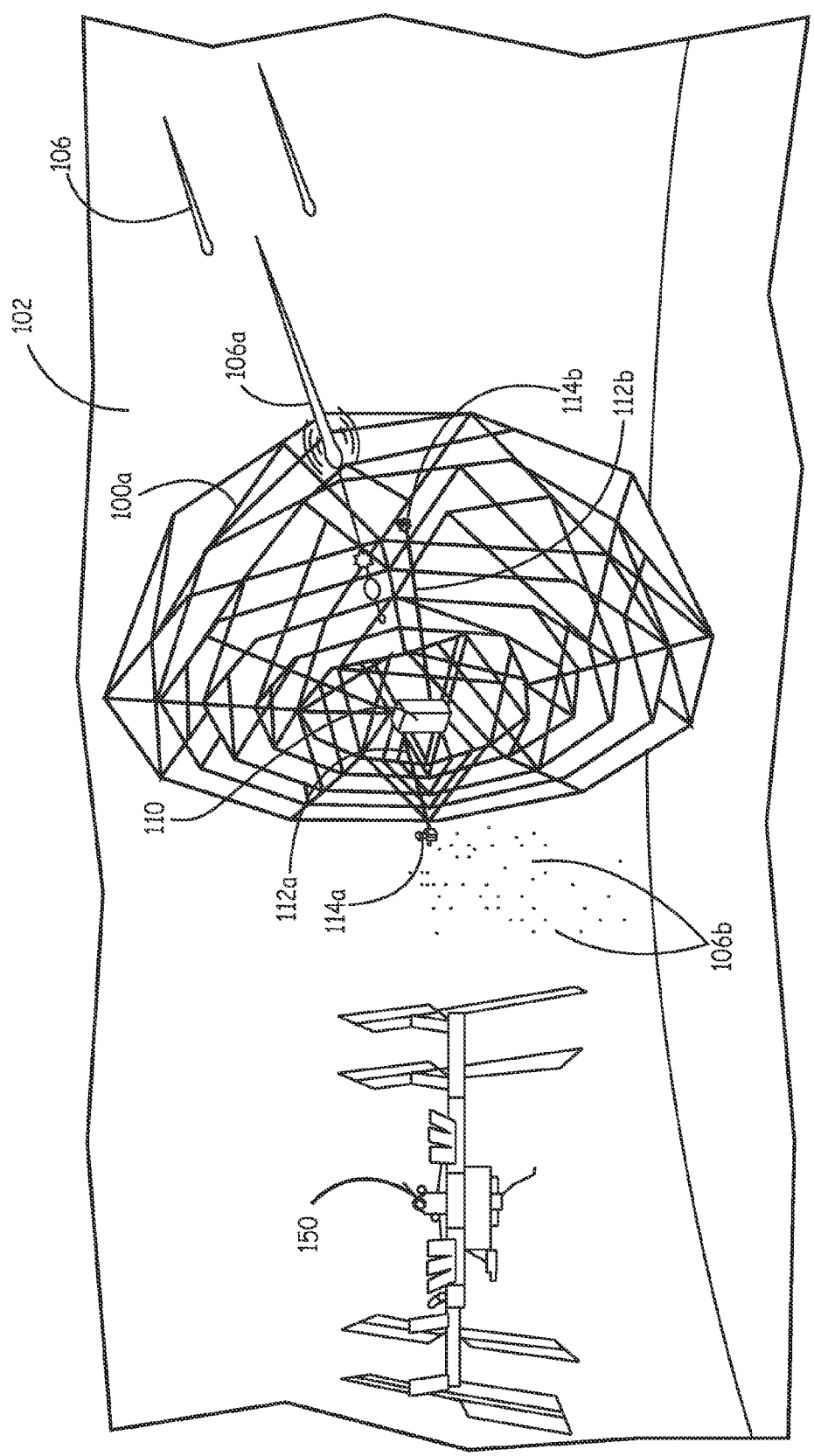
FIG. 4 is an illustration of the orbital debris removal assembly of FIG. 1 in a partially deployed configuration, positioned to protect a satellite.

FIG. 4 illustrates another method of deploying an orbital removal assembly 100 of an embodiment. As illustrated in this deployment, a first section 100a of an orbital removal assembly 100 is deployed to form partial spherically shaped netting layers 220a through 220e that are used to protect an asset 150 (such as the International Space Station). In this embodiment, the spacecraft 110 positions the partial spherically shaped netting layers 220a through 220e to protect the asset from debris 106. Hence, the orbital removal assembly 100 in this configuration can be used in situations where known orbital information from the NASA office of Orbital Debris tracks debris heading towards the asset 150. The orbital debris removal assembly 100 can then be moved to intercept the debris 106 as illustrated in FIG. 4 before it hits the asset 150.

Figure 5:
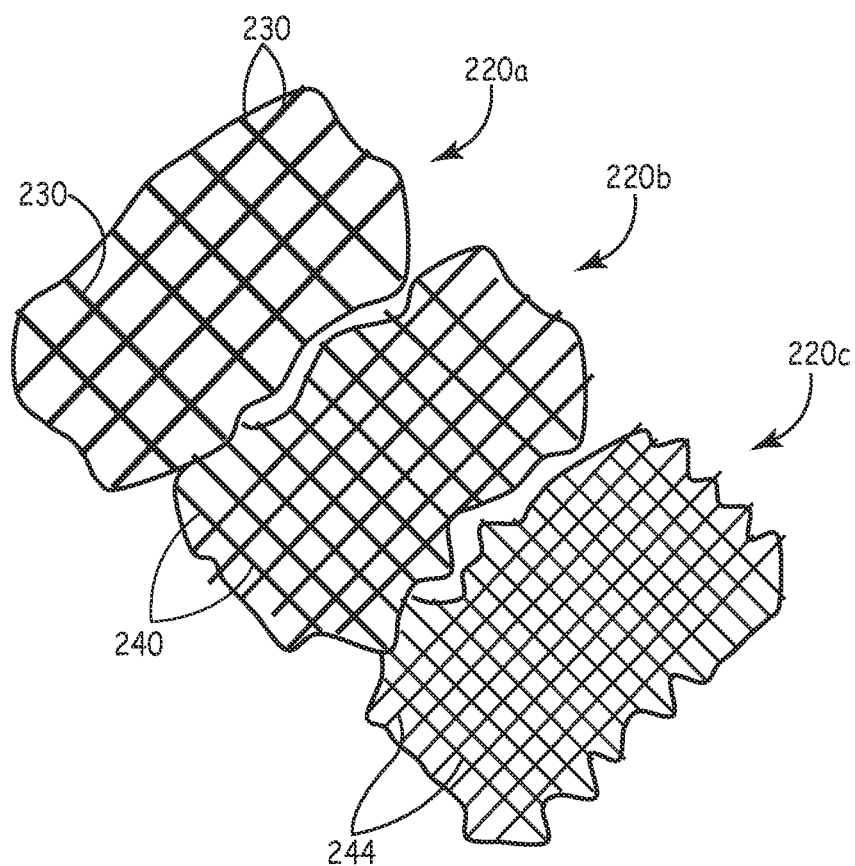
FIG. 5 is an illustration of a plurality of layers of netting of one embodiment of the present invention.

Referring to FIG. 5, an illustration of three layers of the netting 220a, 220b and 220c is illustrated. In this illustration, fibers 230 make up the first layer of netting 220a and fiber 240 make up the second layer of netting 220b and fibers 244 make up the third layer of netting 220c. As FIG. 5 illustrates, the fibers 230, 240, and 244 have different thicknesses. In particular, fibers 230 that would be on the first layer of netting 220a are thicker than the fibers 240 in the second layer of netting 220b which in turn are thicker than the fibers 244 in the third layer of netting 220c. Each fiber wire thickness is sized to ensure the breakup of incident particles into smaller particles. For example, fiber wire thickness used for composite fiber embodiments is in the range of 0.03 to 0.25 cm. Also illustrated in FIG. 5 is that the fibers 230, 240 and 244 have a different netting density. In particular, fibers 230 in the first layer of 220a have less fiber mesh density than the fibers 240 in the second layer 220b which in turn is less dense than the fiber netting 244 in the third layer of netting 220c. The fiber mesh density (or mesh spacing) in each shell layer is designed to insure that all particles of interest will intersect at least one of the outer shell layers 220a, 220b, etc., in a least three locations and the resulting smaller particles will intersect with inner shell layers 220b through 220e. Examples, of ranges of mesh spacing would be 0.07 to 0.70 cm and mass densities for composite fibers include 0.9 to 1.5 g/cm^3. In one embodiment that uses composite fibers, a wire/particle ratio of approximately 0.025 is used to insure the breakup of incident particles into smaller particles. As discussed above, the fibers 230, 240, and 244 in some embodiments are composite fibers. Examples of composite fibers that could be used include, but are not limited to, para-aramid synthetic fibers such as Dyneema and Spectra, polyolefin and ceramic. In another embodiment, wires are used to form the layers of netting. The spacing between netting layers 220a through 220e in one embodiment are in the 0.30 to 1 m range. In further one embodiment, the netting layers 220a through 220e are spaced 10's to 100's of centimeters apart. In one embodiment the layers 220a through 220e are evenly spaced. In another embodiment the spacing is varied.

Figure 6:
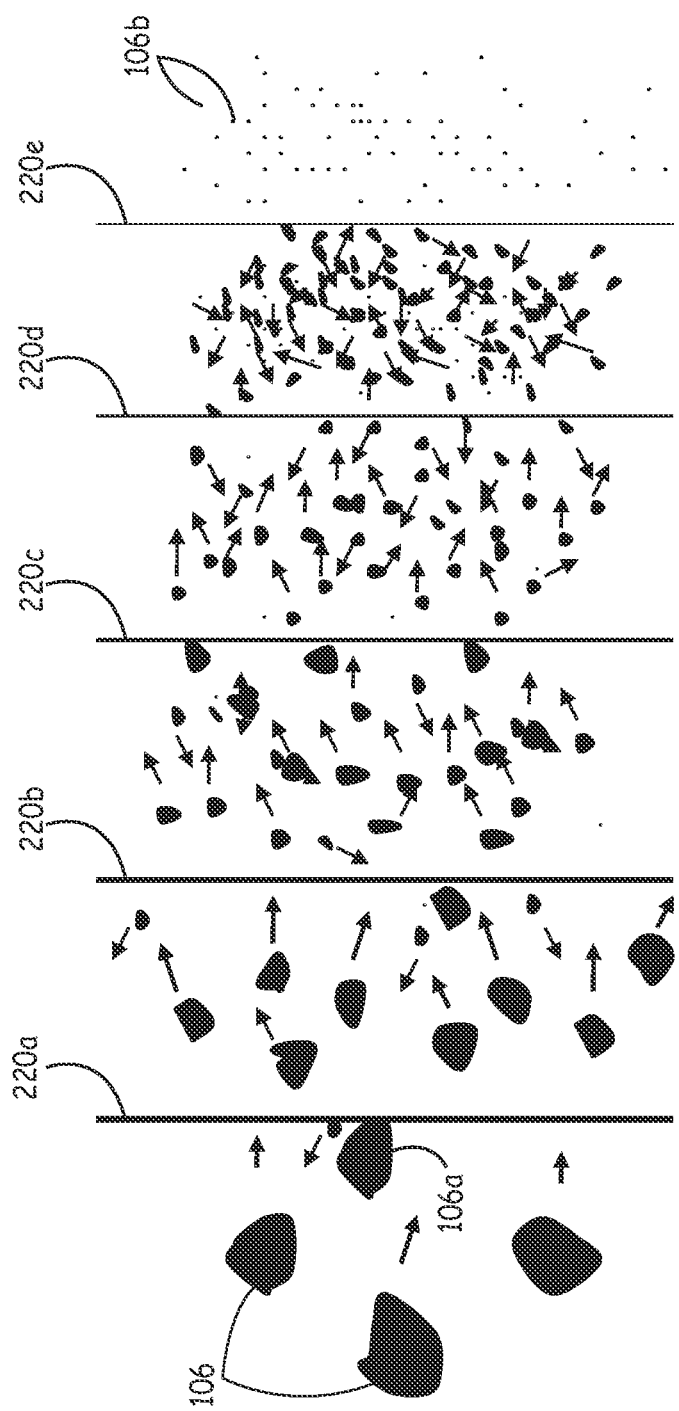
FIG. 6 is an illustration of debris engaging the plurality of layers of netting in one embodiment of the present invention.

FIG. 6 illustrates how embodiments of the present invention interact with debris 106. In particular, FIG. 6 illustrates the first layer of netting 220a, the second layer of netting 220b, the third layer of netting 220c, the fourth layer of netting 220d, and the fifth layer of netting 220e. Depending on the speed of the debris and what the debris is made of, the impact of the debris on a layer of netting 220a through 220e will melt, vaporize or fragment. FIG. 6 illustrates the debris fragmenting on the netting layers 220a through 220e. As illustrated, some high velocity debris particles 106 are broken up on impact upon the first outer layer of the netting 220a. In particular, FIG. 6 illustrates debris particle 106a impacting the first layer of netting 220a and a small particle breaking off. Besides breaking off larger particles, the layers of netting 220a-220e work to deflect the direction of resulting particles. Debris particles that pass through the first layer of netting 220a are illustrated passing through space between the first layer of netting 220a and the second layer of netting 220b. As illustrated, these particles are smaller in size and travel in a more arbitrary direction because of deflections. In fact, some of the particles will start colliding with each other to produce even smaller particles. As the particles or debris collide with subsequent layers of netting 220b, 220c, 220d, 220e further break down in the particle size is accomplished. Moreover, as the particles traverse through the layers of netting 220a, 220b, 220c, 220d and 220e the randomness of their traveling direction is increased such that an increase in particle to particle collisions between the layer netting is increased. For example, particles traveling between layers 220b and 220c are smaller than the particles between the first layer of netting 220a and 220b and are traveling in more random directions due to deflections off the respective layers of netting. Further, particles of debris in between layers of netting 220c and 220d are smaller still than the particles in-between layers of netting of 220b and 220c. Moreover, their direction of travel is even more random causing even more collisions between particles. Further yet, particles between layers of netting 220d and 220e are even smaller than particles between 220c and 220d. Moreover, their travel of direction is still further more random than the particles in subsequent areas between layers as discussed above. Hence, embodiments of the orbital debris removal assembly 100 provide a mass fission effect such that the particles energies cause the particles to work on themselves to break up to even more smaller particles until only small shield-able debris 106b (0.2 mm) escapes from the orbital debris removal assembly 100.

Figure 7:
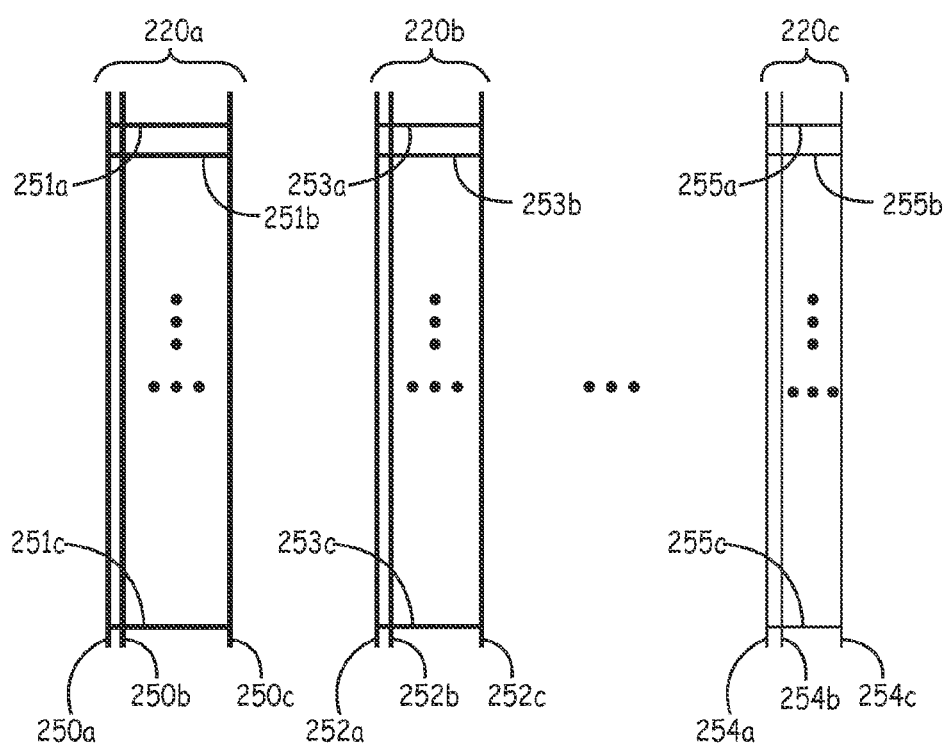
FIG. 7 is a side view illustration of sub-layers of the layers of netting of one embodiment of the present invention.

In some embodiments, each layer of netting 220a through 220e is made of a plurality of sub-layers of meshed fiber netting. For example, referring to FIG. 7, layer 220a is shown as being made up of sub-layers 250a through 250c, layer 220b is shown as being made up of sub-layers 252a through 252c and layer 220e is shown as being made up of sub-layers 254a through 254c. The number of sub-layers per layer can vary depending on the application and desired outcome. In one embodiment 3 to 10 sub-layers are used per layer.

Figure 8:
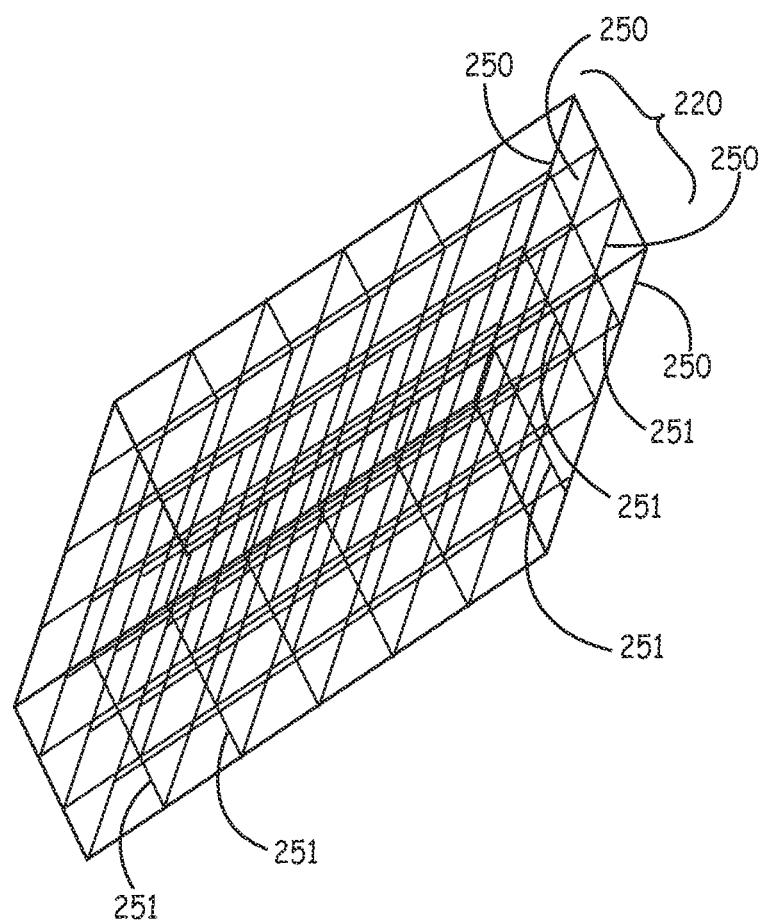
FIG. 8 is an illustration of a sub-layer in one embodiment of the present invention.

Further in one embodiment, the sub-layers are coupled together with connecting fibers 251. An example illustration of this is illustrated in FIG. 8. As the example illustration of FIG. 8 shows, sub-layers (generally designated as 250) of a layer (generally designated as 220) are coupled together by connecting fibers (generally designated as 251). In this example illustration, each sub-layer 250 comprises an in-plane netting arrangement of meshed fibers that are connected to adjacent sub-layers 250 with a connecting fibers 251. If the orbital debris removal assembly 100 is in the shape of at least a partial sphere, the connecting fibers 251, in one embodiment, are connected to each associated sub-layer 250 in a radially extending configuration. The connection fibers 251 not only tie the sub-layers 250 together but also provide a contact surface for which incoming debris can interact with as the debris penetrates the shield. Although, the sub-layers 250 are shown in FIG. 8 as being spaced from each other for illustration purposes, in some embodiments adjacent sub-layers are in contact with each other.

Figure 9:
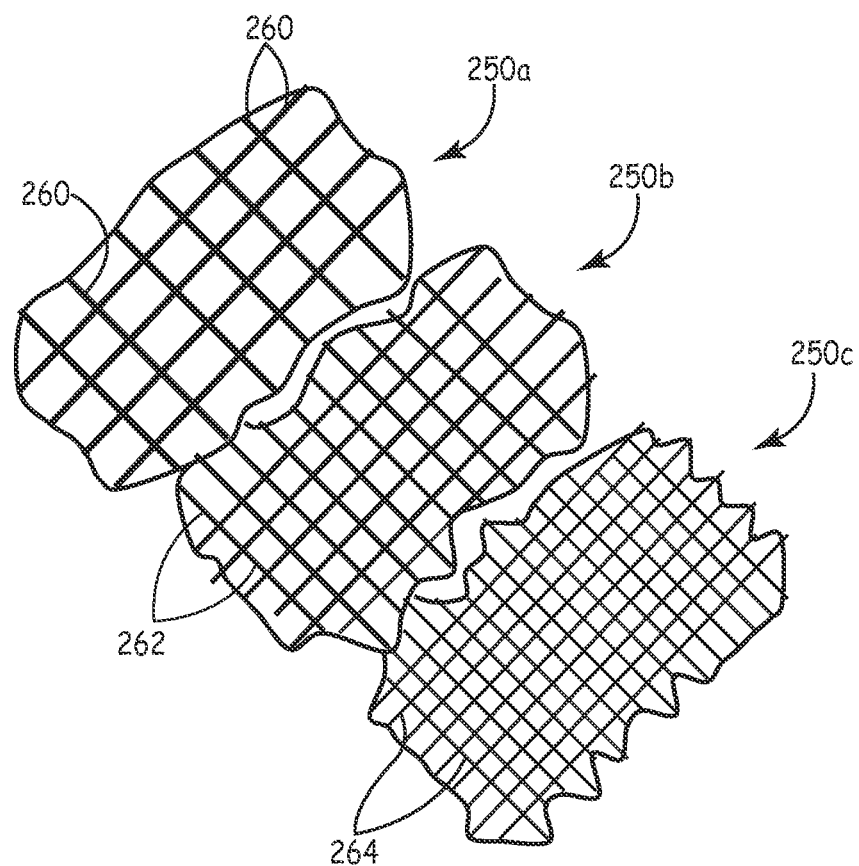
FIG. 9 is an illustration of meshed netting used to form a sub-layer in one embodiment of the present invention.

In one embodiment, the sub-layers 250 in a layer 220 have fibers with uniform fiber thickness, uniform netting spacing (netting density) and fiber alignment as illustrated in FIG. 8. In another embodiment the sub-layers 250a through 250c, 252a through 252c and 254a through 254c can vary in fiber thickness and netting spacing. For example, in FIG. 9, an illustration of some sub-layers 250a through 250c of layer 220a is illustrated. As FIG. 9 illustrates, the fibers 260 that make up the netting of the first sub-layer 250a have a different thickness and netting spacing than the fibers 262 that make up the second sub-layer 250b which in turn have a different thickness and netting spacing then the fibers that make up the third sub-layer 250c.

Although specific embodiments have been illustrated and described herein, it will be appreciated by those of ordinary skill in the art that any arrangement, which is calculated to achieve the same purpose, may be substituted for the specific embodiment shown. For example, the embodiments described above are generally described as being constructed to deal with debris in the range of 0.3 cm to 10 cm. However, the invention can be used to deal with larger or smaller debris with the above described component sizes being modified accordingly. This application is intended to cover any adaptations or variations of the present invention. Therefore, it is manifestly intended that this invention be limited only by the claims and the equivalents thereof.

The invention claimed is:

1. An orbital debris removal and asset protection assembly comprising:
   a plurality of spaced layers of netting, each netting layer including sub-layers of meshed composite fibers configured and arranged to break up debris that comes in contact with the assembly, the composite fibers that make up the meshed fibers having a select thickness, the thickness of the composited fibers of one layer of the plurality of spaced layers of netting being different than the thickness of the fibers in at least one other layer of the plurality of spaced layers of netting.

2. The orbital debris removal and asset protection assembly of claim 1, further comprising:
   each spaced layer of netting having a fiber mesh density, the fiber mesh density of one layer of the plurality of spaced layers of netting having a different fiber mesh density of at least one other layer of the plurality of spaced layers of netting.

3. The orbital debris removal and asset protection assembly of claim 1, further comprising:
   the plurality of spaced layers of netting including an outer layer, an inner layer and at least one mid layer positioned between the outer and inner layers, the thickness of the outer layer being greater than the thickness of the inner layer.

4. The orbital debris removal and asset protection assembly of claim 1, further comprising;
   the plurality of spaced layers of netting at least partially being in a sphere shape.

5. The orbital debris removal and asset protection assembly of claim 1, further comprising:
   frame members configured and arranged to hold to the plurality of spaced layers of netting.

6. The orbital debris removal and asset protection assembly of claim 5, wherein the frame members are configured and arranged to be folded up to put the orbital debris removal assembly in a stowed position.

7. The orbital debris removal and asset protection assembly of claim 1, wherein the composite fibers are at least one of para-aramid, polyolefin, ceramic and Dyneema fiber bundles.

8. The orbital debris removal and asset protection assembly of claim 1, further comprising:
   a spacecraft coupled to the plurality of spaced layers of netting.

9. The orbital debris removal and asset protection assembly of claim 8, further comprising:
   the spacecraft further configured to selectively deploy the plurality of spaced layers of netting and store the plurality of spaced layers of netting.

10. An orbital debris removal and asset protection assembly comprising:
    a spacecraft configured to navigate in space; and
    a plurality of spaced netting layers coupled to the spacecraft, each netting layer including meshed fibers, each spaced netting layer having a fiber mesh density, the fiber mesh density of one layer of the plurality of spaced netting layers having a different fiber mesh density of at least one other layer of the plurality of spaced netting layers.

11. The orbital debris removal and asset protection assembly of claim 10, wherein the meshed fibers are composite fibers.

12. The orbital debris removal and asset protection assembly of claim 10, further comprising:
    frame members coupled to the spacecraft, the frame member further configured and arranged to form the plurality of the spaced netting layers.

13. The orbital debris removal and asset protection assembly of claim 12, wherein the frame members form the spaced netting layers in at least a partial sphere shape.

14. The orbital debris removal and asset protection assembly of claim 10, further comprising:
    the plurality of spaced netting layers having an outer layer, an inner layer and at least one mid layer between the outer layer and the inner layer, the fiber mesh density of the outer layer being less than the fiber density of the inner layer.

15. The orbital debris removal and asset protection assembly of claim 10, further comprising:
    the plurality of spaced netting layers having an outer layer, an inner layer and at least one mid layer between the outer layer and the inner layer; and
    the meshed fibers in each layer having a select thickness, the thickness of the meshed fibers in each spaced layer decreasing from the outer layer to the inner layer.

16. The orbital debris removal and asset protection assembly of claim 10, wherein each netting layer, includes a plurality of sub-layers of meshed fibers.

17. The orbital debris removal and asset protection assembly of claim 16, further comprising:
    a plurality of connecting fibers configured and arranged to couple the sub-layers together.

18. The orbital debris removal and asset protection assembly of claim 16, wherein at least one sub-layer of the plurality of sub-layers has a different fiber spacing than at least one other sub-layer.

19. The orbital debris removal and asset protection assembly of claim 17, wherein at least one sub-layer of the plurality of sub-layers has a different fiber thickness than at least one other sub-layer.

20. An orbital debris removal and asset protection assembly comprising:

a plurality of spaced layers of netting formed in at least a partial sphere shape, each netting layer including meshed composite fibers, the plurality of spaced layers of netting having an outer layer, an inner layer and at least one mid layer between the outer layer and the inner layer, each layer of netting having a select fiber density of the meshed composite fibers, the fiber density of the outer layer being less than the fiber density of the inner layer, the meshed composite fibers of each netting layer having a select fiber thickness, the fiber thickness of the outer layer being larger than the fiber thickness of the inner layer.

\* \* \* \* \*